UNITED STATES PATENT OFFICE.

WILLIAM J. ARMBRUSTER, OF ST. LOUIS, MISSOURI.

PIGMENT AND PROCESS OF MAKING SAME.

SPECIFICATION forming part of Letters Patent No. 719,073, dated January 27, 1903.

Application filed May 26, 1902. Serial No. 109,092. (No specimens.)

*To all whom it may concern:*

Be it known that I, WILLIAM J. ARMBRUSTER, a citizen of the United States, residing at St. Louis, State of Missouri, have invented certain new and useful Improvements in Pigments and Processes of Making the Same, of which the following is a specification.

My invention has relation to improvements in compositions of matter to be used for pigments and in the process of making the same; and it consists, respectively, in the novel product and the new steps more fully set forth in the specification and pointed out in the claims.

The composition consists of an intimate mixture of the precipitates of barium carbonate, zinc hydrate, and barium sulfate in proportions determined by the molecular combination of the soluble salts from which the precipitates are derived. In the preparation of my compound I employ mixtures of solutions of barium hydrate, (alone or mixed with barium chlorid,) sodium carbonate, and zinc sulfate, whereupon there results a compound precipitate of barium sulfate, zinc hydrate, and barium carbonate, leaving in solution sodium hydrate, (or sodium chlorid, where barium chlorid is used as one of the reagents.) In lieu of sodium carbonate I may of course employ a carbonate of any of the alkali metals—for example, potassium carbonate or ammonium carbonate—without affecting the nature or spirit of the present invention.

As an illustration of the foregoing, I prepare two molecular equivalents of an aqueous solution of barium hydrate, one molecular equivalent of sodium carbonate, and one molecular equivalent of zinc sulfate, whereby there results a compound precipitate of one molecular equivalent of barium sulfate, one equivalent of zinc hydrate, and one equivalent of barium carbonate, leaving a resulting solution of two equivalents of sodium hydrate, all of which will be more fully apparent from the following reaction:

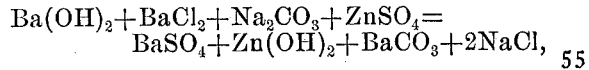

In the event that one molecular equivalent of barium chlorid is substituted for one equivalent of barium hydrate we have the following reaction:

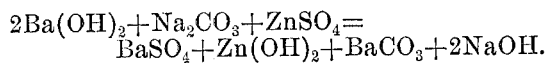

the precipitate remaining the same as under the first reaction and only the character of the final solution being changed, (the chlorid of sodium taking the place of the sodium hydrate.)

The determination of the actual quantities of the materials used in the foregoing reactions are simple stoichiometric problems based upon the atomic weights of the elements constituting any molecule, and as a commercial illustration of the formula contained in the first of the above reactions the following may be cited: I prepare separate aqueous solutions of the following ingredients in the proportions named, viz: three hundred and forty-two (342) pounds of barium hydrate, one hundred and six (106) pounds of sodium carbonate, and one hundred and sixty-one (161) pounds of zinc sulfate and mix them simultaneously in any suitable manner, when a compound molecular precipitate will be formed weighing five hundred and twenty-nine (529) pounds and consisting of two hundred and thirty-three (233) pounds of barium sulfate, ninety-nine (99) pounds of zinc hydrate, and one hundred and ninety-seven (197) pounds of barium carbonate, which can be filtered out and the sodium hydrate remaining in solution recovered by evaporation.

The simultaneity of formation of the several precipitates above referred to will bring them into such intimate relation that no mechanical mixing of the same will be found necessary.

While the above precipitates under the reactions as specified are formed practically at one time, I can so arrange the order of mixture of the original solutions as to form the precipitates successively—that is, one upon the other—in which event they can be readily and intimately mixed by any form of mechanical agitator or mill while still in a moist state. Where the precipitates are formed successively, the character of the solutions from which they are derived is somewhat departed from. This departure consists in the substitution of one molecule of barium sulfid, and while I do not wish to be limited to the use of the barium sulfid, (the chlorid or hydrate being full equivalents,) yet the time of the addition of this salt will be dependent on the moment of formation of the zinc hydrate derived from a previous precipitation. To illustrate: I take one molecular equivalent of barium hydrate and add thereto one molecular equivalent of sodium carbonate, the mixture resulting in a precipitate of one chemical equivalent of barium carbonate, there remaining two chemical equivalents of sodium hydrate in solution. The solution is separated from the precipitate and mixed with one chemical equivalent of zinc sulfate, when there results a precipitate of one chemical equivalent of zinc hydrate, there remaining in solution one chemical equivalent of sodium sulfate. The sodium sulfate is separated from the zinc hydrate and mixed with one chemical equivalent of barium sulfid, when there is precipitated one chemical equivalent of barium sulfate, leaving sodium sulfid in solution, which may be drawn off in the usual way. In lieu of the barium sulfid I may substitute barium chlorid or barium hydrate, in which event the final solution will be either sodium chlorid or sodium hydrate, the character of barium salt used being in all cases a question of comparative price at which the barium element contained therein can be obtained and to which by-product of final solution is preferred. When, however, it is decided to use barium hydrate or chlorid for the final barium solution, then the solutions can be brought together simultaneously, the compound, consisting of barium carbonate, zinc hydrate, and barium sulfate, being formed together simultaneously instead of one precipitated after another and upon each other, according to the first reaction given above.

Where the precipitates are formed in succession, as just stated, the reactions may be illustrated, as follows:

$$Ba(OH)_2 + Na_2CO_3 = BaCO_3 + 2NaOH;$$
$$2NaOH + ZnSO_4 = Zn(OH)_2 + Na_2SO_4;$$
$$Na_2SO_4 + BaS = BaSO_4 + Na_2S.$$

Thus the final solution is sulfid of soda, which may become sodium chlorid with the use of barium chlorid or sodium hydrate with the use of barium hydrate in lieu of the barium sulfid. Where, however, the barium sulfid is employed as one of the reagents, it must be added after the formation of the zinc hydrate and the sodium sulfate, as apparent from the last reaction, for were it added at the outset with the barium hydrate there would result a zinc-sulfid precipitate, owing to the greater affinity between the zinc and sulfur, a fact apparent from the following reaction:

$$Ba(OH)_2 + BaS + Na_2CO_3 + ZnSO_4 = BaSO_4 + ZnS + BaCO_3 + 2NaOH.$$

In practice in order to produce the several precipitates successively one after the other I take separate aqueous solutions of the following ingredients in the proportions named, viz: one hundred and seventy-one (171) pounds of barium hydrate, one hundred and six (106) pounds of sodium carbonate, one hundred and sixty-one (161) pounds of zinc sulfate, one hundred and sixty-nine (169) pounds of barium sulfid and bring them together successively in the order named, when one hundred and ninety-seven (197) pounds of barium carbonate, ninety-nine (99) pounds of zinc hydrate, and two hundred and thirty-three (233) pounds of barium sulfate will be precipitated and seventy-eight (78) pounds of sodium sulfid will be formed in the final solution. The precipitates can be filtered out or separated and the sodium sulfid remaining in solution recovered by any suitable evaporating process, which crystallizing with nine molecules of water will form two hundred and forty (240) pounds of sodium-sulfid crystals.

It is of course apparent that I may invoke the doctrine of chemical equivalents wherever the same may apply.

Having described my invention, what I claim is—

1. The process of making pigment which consists in mixing solutions of barium hydrate, a carbonate of an alkali metal, and zinc sulfate, and recovering the resulting precipitates, substantially as set forth.

2. The process of making pigment which consists in mixing solutions of barium hydrate, sodium carbonate, and zinc sulfate, and recovering the resulting precipitates, substantially as set forth.

3. The process of making pigment which consists in mixing solutions of mixtures of barium hydrate and barium chlorid, a carbonate of an alkali metal, and zinc sulfate, and recovering the resulting precipitates, substantially as set forth.

4. The process of making pigment which consists in mixing solutions of mixtures of barium hydrate and barium chlorid, sodium carbonate, and zinc sulfate, and recovering the resulting precipitates, substantially as set forth.

5. The process of making pigment which consists in mixing solutions of the proper molecular equivalents of barium hydrate, sodium carbonate and zinc sulfate, and recovering the resulting precipitates, substantially as set forth.

6. The process of making pigment which consists in mixing a solution of one molecular equivalent of barium hydrate, one equivalent of barium chlorid, one equivalent of the carbonate of an alkali metal, and one equivalent of zinc sulfate, and recovering the resulting precipitates, substantially as set forth.

7. A pigment comprising a mixture of barium carbonate, zinc hydrate, and barium sulfate, substantially as set forth.

8. A pigment comprising a mixture of precipitated barium carbonate, zinc hydrate, and barium sulfate, in proportions corresponding to the molecular weights of the respective compounds, substantially as set forth.

9. A pigment comprising a mixture of the precipitates of one hundred and ninety-seven parts by weight of barium carbonate, ninety-nine parts by weight of zinc hydrate, and two hundred and thirty-three parts by weight of barium sulfate, substantially as set forth.

10. A pigment comprising a mixture of the molecular precipitates of barium carbonate, zinc hydrate, and barium sulfate, substantially as set forth.

In testimony whereof I affix my signature in presence of two witnesses.

WILLIAM J. ARMBRUSTER.

Witnesses:
EMIL STAREK,
G. L. BELFRY.